United States Patent
Yokotani et al.

(10) Patent No.: US 6,939,125 B2
(45) Date of Patent: Sep. 6, 2005

(54) METHOD FOR REDUCING NITROGEN OXIDES IN COMBUSTION GAS FROM COMBUSTION FURNACE

(75) Inventors: Masamichi Yokotani, Yokohama (JP); Yutaka Ishikawa, Yokohama (JP); Atsushi Tanigaki, Yokohama (JP); Daisuke Hasegawa, Yokohama (JP); Shinji Morohashi, Yokosuka (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/412,577

(22) Filed: Apr. 14, 2003

(65) Prior Publication Data

US 2003/0175631 A1 Sep. 18, 2003

Related U.S. Application Data

(63) Continuation of application No. PCT/JP01/08900, filed on Oct. 10, 2001.

(30) Foreign Application Priority Data

Oct. 12, 2000 (JP) .......................................... 2000-312464

(51) Int. Cl.$^7$ .......................... F23C 11/00; C03B 5/235
(52) U.S. Cl. .................... 431/5; 431/7; 431/10
(58) Field of Search ................. 60/732, 733; 431/5, 431/7, 10; 110/210, 211, 212, 214, 213, 345, 348; 422/182

(56) References Cited

U.S. PATENT DOCUMENTS

| | | | | |
|---|---|---|---|---|
| 3,190,823 A | * | 6/1965 | Bloxham | 204/157.3 |
| 3,861,334 A | * | 1/1975 | Stockman | 110/187 |
| 3,890,084 A | * | 6/1975 | Voorheis et al. | 431/10 |
| 4,117,075 A | * | 9/1978 | Sano | 423/235 |
| 4,372,770 A | * | 2/1983 | Krumwiede et al. | 65/27 |
| 4,403,941 A | * | 9/1983 | Okiura et al. | 431/10 |
| 4,496,306 A | * | 1/1985 | Okigami et al. | 431/8 |
| 4,599,100 A | * | 7/1986 | Demarest, Jr. | 65/134.4 |
| 4,790,743 A | * | 12/1988 | Leikert et al. | 431/8 |
| 4,811,555 A | * | 3/1989 | Bell | 60/777 |
| 5,078,064 A | * | 1/1992 | Breen et al. | 110/212 |
| 5,201,650 A | * | 4/1993 | Johnson | 431/9 |
| 5,242,295 A | * | 9/1993 | Ho | 431/10 |
| 5,252,298 A | * | 10/1993 | Jones | 422/172 |
| 5,378,443 A | * | 1/1995 | Engstrom et al. | 423/239.1 |
| 5,387,100 A | * | 2/1995 | Kobayashi | 431/10 |
| 5,441,714 A | * | 8/1995 | Oakes et al. | 423/235 |
| 5,520,123 A | * | 5/1996 | Chappell et al. | 110/188 |
| 5,823,124 A | * | 10/1998 | Koppang | 110/345 |
| 5,915,310 A | * | 6/1999 | Hura et al. | 110/345 |
| 5,954,498 A | * | 9/1999 | Joshi et al. | 432/19 |

FOREIGN PATENT DOCUMENTS

| | | | | |
|---|---|---|---|---|
| EP | 0 683 357 A2 | | 11/1995 | |
| JP | 53-21430 | | 2/1978 | |
| JP | 56-91108 | * | 7/1981 | 431/10 |
| JP | 58-1988606 | | 11/1983 | |
| JP | 62-87707 | * | 4/1987 | 431/10 |
| WO | WO 97/32162 | * | 9/1997 | |

* cited by examiner

*Primary Examiner*—Carl D. Price
(74) *Attorney, Agent, or Firm*—Oblon, Spivak, McClelland, Maier & Neustadt, P.C.

(57) ABSTRACT

A method for reducing $NO_x$ in a combustion gas which is discharged from a combustion furnace for burning a fuel by means of a gas containing oxygen in an amount of at least 80 vol % and which contains oxygen, which method comprises adding a combustible material to the combustion gas at a temperature of from 1,000 to 1,500° C., wherein the combustible material contains a compound comprising C and H.

12 Claims, No Drawings

METHOD FOR REDUCING NITROGEN OXIDES IN COMBUSTION GAS FROM COMBUSTION FURNACE

Continuation of International Application No. PCT/JP01/08900, filed Oct. 10, 2001.

TECHNICAL FIELD

The present invention relates to a method for reducing nitrogen oxides (hereinafter referred to as $NO_x$) in a combustion gas which is discharged from a combustion furnace such as a glass melting furnace for burning a fuel by means of a gas containing oxygen in an amount of at least 80 vol %, rather than burning a fuel by means of air.

BACKGROUND ART

Heretofore, in a glass melting furnace, a glass product is produced by burning a fuel such as heavy oil by means of air, whereby there has been a problem that during such burning, nitrogen in air becomes nitrogen oxides ($NO_x$) in a high temperature state.

In recent years, as a glass melting furnace to solve such a problem, attention has been drawn to a so-called full oxygen-fuel combustion glass melting furnace, wherein a fuel is burned by means of oxygen gas i.e. a gas containing oxygen in an amount of at least 99 vol %. In the full oxygen-fuel combustion glass melting furnace, nitrogen present during combustion of the fuel decreases substantially, and consequently, the amount of $NO_x$ in the combustion gas likewise substantially decreases.

However, even in such a case, nitrogen present during combustion of the fuel will not be 0. Namely, there will be nitrogen contained in air leaked into the furnace from the atmospheric air outside the furnace, nitrogen attributable to a nitrogen compound contained in the fuel, or nitrogen contained as an impurity in the oxygen gas to be used for combustion. It is desired to reduce $NO_x$ in a combustion gas attributable to such nitrogen.

Further, in a case where a nitrate is used as a raw material for glass, $NO_x$ will be formed by the decomposition of the nitrate raw material.

It is difficult to reduce such $NO_x$ even by a full oxygen-fuel combustion glass melting furnace wherein a fuel is burned by means of oxygen gas rather than air.

It is an object of the present invention to provide a method for reducing $NO_x$ in a combustion gas discharged from a combustion furnace wherein a fuel is burned by means of a gas containing oxygen in an amount of at least 80 vol %, such as oxygen gas.

DISCLOSURE OF THE INVENTION

The present invention provides a method for reducing nitrogen oxides in a combustion gas which is discharged from a combustion furnace for burning a fuel by means of a gas containing oxygen in an amount of at least 80 vol % and which contains oxygen, which method comprises adding a combustible material to the combustion gas at a temperature of from 1,000 to 1,500° C., wherein the combustible material contains a compound comprising C and H.

BEST MODE FOR CARRYING OUT THE INVENTION

In the present invention, the gas containing oxygen in an amount of at least 80 vol % will be referred to as the highly concentrated oxygen gas. The highly concentrated oxygen gas may contain a gas other than oxygen, and a typical example thereof is nitrogen or argon. The present invention is suitable for reducing $NO_x$ in a combustion gas from a combustion furnace wherein a highly concentrated oxygen gas containing oxygen in an amount of at least 90 vol %, is used for combustion of a fuel, and is particularly suitable for reducing $NO_x$ in a combustion gas from a combustion furnace wherein a highly concentrated oxygen gas containing oxygen in an amount of at least 99 vol %, is used for combustion of a fuel.

In the present invention, the fuel means a gas fuel such as a city gas, a liquid fuel such as heavy oil or a solid fuel such as coal.

In the present invention, the combustion furnace is not particularly limited, and it may, for example, be a glass melting furnace or a metal melting furnace. The following description will be made with reference to a case of the glass melting furnace.

The "combustion gas which is discharged from a glass melting furnace" to be treated by the present invention, contains oxygen at the time when the after-described combustible material is added. This oxygen is attributable to excess oxygen at the time of combustion or attributable to oxygen contained in air leaked into the furnace or flue from the atmospheric air outside the furnace. The content of such oxygen is typically at least 0.1 vol %. Here, the content of oxygen in the combustion gas in the present invention is one calculated as dried i.e. one measured by removing moisture from the combustion gas.

The combustion gas discharged from a glass melting furnace usually passes through a flue and is discharged from a chimney into the atmosphere. The temperature of the combustion gas as discharged from a glass melting furnace, is typically from 1,200 to 1,600° C., but the temperature as discharged from the chimney to the atmosphere typically lowers to a level of from 50 to 300° C. This temperature drop is due to e.g. cooling via the wall of the flue. The flue is a tunnel-like pathway, and various devices such as heat recovery devices, may be installed therein, as the case requires. In the present invention, a pathway inclusive of such various devices, will be referred to as a flue.

As mentioned above, the temperature of the combustion gas gradually decreases as it advances in the flue. In the present invention, the combustible material is added to the combustion gas at a location where the combustion gas is from 1,000 to 1,500° C., to reduce $NO_x$ in the combustion gas.

The combustible material contains a compound comprising C and H, typically a hydrocarbon, and it may, for example, be a city gas, a natural gas, a liquefied petroleum gas, a coal gas, acetylene, a kerosine oil, a light oil, a heavy oil or powdered coal.

Reduction of $NO_x$ is considered to be attributable to the reaction which will be described next. Namely, by pyrolysis of the above combustible material, a radical substance made of e.g. a hydrocarbon will be formed, whereupon $NO_x$ in the combustion gas will react with the radical substance to form $CO_2$, $N_2$, $H_2O$, CO, etc., whereby $NO_x$ in the combustion gas will decrease.

If the temperature at which the combustible material is added, is lower than 1,000° C., the pyrolysis of combustible material tends to be inadequate. It is preferably at least 1,100° C., more preferably at least 1,200° C. If it exceeds 1,500° C., O (oxygen atom) present in the combustion gas will react with N (nitrogen atom) present in the combustion gas to form $NO_x$ (so-called thermal $NO_x$), i.e. $NO_x$ rather increases. It is preferably at most 1,450° C.

The combustible material may be added in any state of a gas state, a liquid state and a solid state such as a powder. It is particularly preferred to add it in a gas state or a liquid state, especially in a gas state, since the handling will be easy, or dispersion in the combustion gas will be easy.

The amount A of the combustible material to be added, is preferably at least 0.05 time the amount $A_0$ of the combustible material required to react and extinct oxygen present in the combustion gas. Here, "the amount of the combustible material required to react and extinct oxygen present in the combustion gas" is the amount of the combustible material which is necessary and sufficient to extinct the oxygen by the reaction of the oxygen and the combustible material, and it can be stoichiometrically calculated.

If A is less than 0.05 time $A_0$, reduction of $NO_x$ tends to be inadequate, or $NO_x$ may rather increase due to formation of thermal $NO_x$. It is more preferably at least 0.1 time, particularly preferably at least 0.5 time, most preferably at least 1.0 time. Further, A is preferably at most 3.0 times $A_0$. Even if it is added beyond 3.0 times, no further increase will be observed in the reduction rate of $NO_x$, and the reduction efficiency of $NO_x$ may decrease. Here, the reduction efficiency of $NO_x$ is the ratio of "the increase in the reduction rate of $NO_x$ due to addition of the combustible material" to "the amount of the combustible material added".

In a case where the combustible material is added at two or more locations, the above A is the total of the amounts of the combustible material added at the respective locations, and the above $A_0$ is the amount of the combustible material required to react and extinct the oxygen at the most upstream location for the addition of the combustible material. Further, the above "oxygen present in the combustion gas" includes the oxygen in the oxygen-containing gas in a case where the oxygen-containing gas such as a highly concentrated oxygen gas or air is supplied to the combustion gas at the same time as the addition of the combustible material.

The total B of the net calorific value of the combustible material to be added, is preferably from 0.5 to 7.9% of the total $B_1$ of the net calorific value of the fuel to be burned in the combustion furnace. If it is less than 0.5%, reduction of $NO_x$ tends to be inadequate. It is preferably at least 2.0%. In a case where the increase of the reduction rate of $NO_x$ is considered to be more important than the increase of the reduction efficiency of $NO_x$, it is particularly preferably at least 3.1%. If it exceeds 7.9%, no further increase of the reduction rate of $NO_x$ will be observed, and the reduction efficiency of $NO_x$ may decrease. It is preferably at most 6.0%. In a case where the increase in the reduction efficiency of $NO_x$ is considered to be more important than the increase in the reduction rate of $NO_x$, it is particularly preferably at most 2.9%. In a case where the combustible material is added at two or more locations, the above-mentioned "total of the net calorific value of the combustible material" is the total of the net calorific value of the combustible material added at the respective locations. The same applies also to the above "total of the net calorific value of the fuel to be burned in the combustion furnace".

The time until the temperature of the combustion gas having the combustible material added, lowers to 600° C., is preferably at least 0.3 second. If it is less than 0.3 second, the reaction of the radical substance made of e.g. the above-mentioned hydrocarbon with $NO_x$ in the combustion gas, tends to be inadequate. It is more preferably at least 1 second, particularly preferably at least 2 seconds. In a case where the combustible material is added at two or more locations, the above time is the time required for the combustion gas to move from the most upstream location for addition of the combustible material to a location where the temperature of the combustion gas becomes 600° C.

In a case where CO formed by the addition of the above combustible material, is likely to remain in the combustion gas to be discharged from the chimney, it is preferred to add an oxygen-containing gas to the combustion gas at a temperature of at least 600° C. and lower than 1,000° C., after addition of the combustible material. By the addition of the oxygen-containing gas, CO will be oxidized to $CO_2$, whereby CO will be removed.

Further, ammonia, etc., may be incorporated to the combustion gas, within a range not to impair the purpose of the present invention.

EXAMPLES

A city gas (net calorific value per 1 m³ (standard state): 9,940 kcal) was added to a combustion gas which was discharged from a glass melting furnace wherein 211 l/hr of a heavy fuel oil (net calorific value: 9,100 kcal/l) was burned by means of 442 m³/hr of an oxygen gas containing 99.8 vol % of oxygen and 0.2 vol % in total of nitrogen and argon and which contained oxygen. Here, the composition of the city gas was such that, as represented by vol %, $CH_4$: 88.5%, $C_2H_6$: 4.6%, $C_2H_8$: 5.4% and $C_4H_{10}$: 1.5%, and the above-mentioned oxygen gas flow rate of 442 m³/hr is a flow rate in a standard state. Hereinafter, the flow rate of a gas or the amount of a gas added will be represented as the flow rate or the amount added in a standard state.

Shown in Table 1 are the temperature T of the combustion gas to which the city gas was added, the oxygen concentration of the combustion gas, the amount A of the city gas added, the ratio of A to the amount $A_0$ of the city gas required to react and extinct the oxygen present in the combustion gas, i.e. $A/A_0$, the ratio of the total B of the net calorific value of the city gas to be added, to the total $B_1$(=1.92×10⁶ kcal/hr) of the net calorific value of the fuel to be burned in the combustion furnace, i.e. $B/B_1$, and the reduction rate of $NO_x$ in a combustion gas having the temperature dropped to 520° C.

Examples 2 to 6 represent Working Examples of the present invention, and Example 1 represents a Comparative Example. The oxygen concentration in the combustion gas in Example 1 is one at the same location at which the city gas was added in Examples 2 to 5. Further, the time until the temperature of the combustion gas lowered to 600° C. after the addition of the city gas was 1.9 seconds, and the time until it lowered to 520° C., was 2.0 seconds, in Example 4.

TABLE 1

| Example No. | 1 | 2 | 3 | 4 | 5 | 6 |
|---|---|---|---|---|---|---|
| T (° C.) | 1,445 | 1,445 | 1,445 | 1,445 | 1,445 | 1.260 |
| Oxygen concentration (vol %) | 3.4 | 8.6 | 8.6 | 3.4 | 3.4 | 7.6 |

TABLE 1-continued

| Example No. | 1 | 2 | 3 | 4 | 5 | 6 |
|---|---|---|---|---|---|---|
| A (m³/hr) | 0 | 1.2 | 2.4 | 5.0 | 10.0 | 2.4 |
| $A/A_0$ | 0 | 0.06 | 0.11 | 0.86 | 1.73 | 0.14 |
| $B/B_1$ (%) | 0 | 0.6 | 1.2 | 2.6 | 5.2 | 1.2 |
| Reduction rate of $NO_x$ (%) | 0 | 8 | 30 | 85 | 90 | 9 |

As another Example, 17.5 m³/hr of the above city gas was added to a combustion gas (temperature: 1,086° C.) which was discharged from a glass melting furnace wherein 227 l/hr of a heavy fuel oil (net calorific value: 9,450 kcal/l) was burned by means of 523 m³/hr of a gas containing 93 vol % of oxygen, 2.5 vol % of nitrogen and 4.5 vol % of argon and which contained 14 vol % of oxygen. $A/A_0$ was 0.2, $B/B_1$ was 8.2%, and the reduction rate of NOx in a combustion gas having the temperature dropped to 520° C., was 39%.

Industrial Applicability $NO_x$ in a combustion gas discharged from a combustion furnace wherein a fuel is burned by means of a highly concentrated oxygen gas containing oxygen in an amount of at least 80 vol %, can be efficiently reduced. Especially, remaining $NO_x$ even in a combustion gas from a full oxygen-fuel combustion glass melting furnace, can be efficiently reduced.

The entire disclosure of Japanese Patent Application No. 2000-312464 filed on Oct. 12, 2000 including specification, claims and summary is incorporated herein by reference in its entirety.

What is claimed is:

1. A method for reducing nitrogen oxides in an exhaust combustion gas containing oxygen, which method comprises adding a combustible material to said exhaust combustion gas at a temperature of from 1,000 to 1,500° C., wherein the combustible material contains a compound comprising C and H, and wherein the exhaust combustion gas has been discharged from a combustion furnace in which a fuel has been burned by means of a gas containing at least 80 vol.% oxygen, and wherein the total of the net calorific value of the combustible material is from 0.5 to 7.9% of the total of the net calorific value of the fuel to be burned in the combustion furnace.

2. The method for reducing nitrogen oxides according to claim 1, wherein the combustible material is added in an amount of at least 0.05 time the amount of the combustible material required to react and eliminate oxygen present in the exhaust combustion gas.

3. The method for reducing nitrogen oxides according to claim 1, wherein the total of the net calorific value of the combustible material to be added, is at least 3.1% of the total of the net calorific value of the fuel to be burned in the combustion furnace.

4. The method for reducing nitrogen oxides according to claim 1, wherein the time until the temperature of the exhaust combustion gas having the combustible material added is lowered to 600° C. is at least 0.3 second.

5. The method for reducing nitrogen oxides according to claim 1, wherein said gas contains at least 90 vol.% oxygen.

6. The method for reducing nitrogen oxides according to claim 1, wherein said gas contains at least 99 vol.% oxygen.

7. The method for reducing nitrogen oxides according to claim 1, wherein the combustion furnace is a glass melting furnace.

8. The method for reducing nitrogen oxides according to claim 1, wherein the combustion furnace is a metal melting furnace.

9. The method for reducing nitrogen oxides according to claim 1, wherein the combustible material is added to the exhaust combustion gas at a temperature of at least 1,100° C.

10. The method for reducing nitrogen oxides according to claim 1, wherein the combustable material is added to the exhaust combustion gas at a temperature of at least 1,200° C.

11. The method for reducing nitrogen oxides according to claim 1, wherein the combustable material is added to the exhaust combustion gas at a temperature of at most 1,450° C.

12. The method for reducing nitrogen oxides according to claim 1, wherein the total of the net calorific value of the combustible material to be added, is from 2.0 to 7.9% of the total of the net calorific value of the fuel to be burned in the combustion furnace.

* * * * *